(12) United States Patent
Tata et al.

(10) Patent No.: US 11,200,265 B2
(45) Date of Patent: Dec. 14, 2021

(54) AUTOMATED GENERATION OF NARRATIVE RESPONSES TO DATA QUERIES

(71) Applicant: ACCENTURE GLOBAL SOLUTIONS LIMITED, Dublin (IE)

(72) Inventors: Swati Tata, Bangalore (IN); Madhura Shivaram, Bangalore (IN); Deepak Kumar, Bangalore (IN); Pratip Samanta, Bangalore (IN); Srikrishna Raamadhurai, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 991 days.

(21) Appl. No.: 15/590,879

(22) Filed: May 9, 2017

(65) Prior Publication Data
US 2018/0329987 A1   Nov. 15, 2018

(51) Int. Cl.
| | | |
|---|---|---|
| *G06F 16/33* | (2019.01) | |
| *G06F 16/338* | (2019.01) | |
| *G06F 40/30* | (2020.01) | |
| *G06N 5/04* | (2006.01) | |
| *G06F 40/56* | (2020.01) | |
| *G06F 40/131* | (2020.01) | |
| *G06F 40/186* | (2020.01) | |
| *G06F 40/211* | (2020.01) | |
| *G06F 40/253* | (2020.01) | |
| *G06F 40/279* | (2020.01) | |
| *G06F 40/284* | (2020.01) | |

(Continued)

(52) U.S. Cl.
CPC ........ *G06F 16/3344* (2019.01); *G06F 16/338* (2019.01); *G06F 40/131* (2020.01); *G06F 40/186* (2020.01); *G06F 40/211* (2020.01); *G06F 40/253* (2020.01); *G06F 40/279* (2020.01); *G06F 40/284* (2020.01); *G06F 40/30* (2020.01); *G06F 40/56* (2020.01); *G06N 3/0445* (2013.01); *G06N 3/08* (2013.01); *G06N 5/041* (2013.01); *G06N 3/0481* (2013.01)

(58) Field of Classification Search
CPC .......................... G06F 16/3344; G06F 16/338
See application file for complete search history.

(56) References Cited

U.S. PATENT DOCUMENTS

2003/0121026 A1* 6/2003 Wang .................... G06F 40/211
717/124
2013/0031113 A1* 1/2013 Feng .................... G06F 16/9537
707/755

(Continued)

*Primary Examiner* — Kannan Shanmugasundaram
(74) *Attorney, Agent, or Firm* — Mannava & Kang, P.C.

(57) ABSTRACT

A narrative response generator receives a user data query specifying variables and data sources from which to extract information desired by a user. The narrative response presents the information desired by the user in a non-textual format such as graphs and a textual format such as one or more paraphrases that are automatically generated by a sentence struct model. The sentence struct model generates context free grammar (CFG) which provides templates for generating word sequences that contain natural language words and placeholders. The placeholders are replaced with values obtained from the user data query for generating grammatically-accurate, complete paraphrases. The narrative response may additionally include information extracted from external data sources.

19 Claims, 13 Drawing Sheets

(51) Int. Cl.
*G06N 3/04* (2006.01)
*G06N 3/08* (2006.01)

(56) References Cited

U.S. PATENT DOCUMENTS

| | | | |
|---|---|---|---|
| 2013/0226846 A1* | 8/2013 | Li | G06N 5/02 706/12 |
| 2016/0055155 A1* | 2/2016 | Allen | G06F 16/3331 707/749 |
| 2016/0098592 A1* | 4/2016 | Lee | G06F 19/321 434/236 |
| 2016/0140453 A1* | 5/2016 | Adderly | G06N 5/022 706/11 |
| 2016/0196265 A1* | 7/2016 | Allen | G06F 16/24575 707/734 |

* cited by examiner

1000

Narrative Advisor

Configuration Framework
Customer Name: demo-org 1
Project Name: social_media

Insight Planner | Learning Module | External Data
~1002    ~1004           1006

Upload file [          ] [Browse]  [Upload]
                          1008

1010
Add data

Variable name * [Select sheet] [Select]

Related variable * [Select sheet] [Select] [Select]

FIG. 10

AUTOMATED GENERATION OF NARRATIVE RESPONSES TO DATA QUERIES

BACKGROUND

Documents such as reports are widely used for presenting information in an organized manner. The reports may include text, images, numeric or alpha-numeric data. The presentation of information in a document in an organized manner may be achieved through creative use of tables, infographics, images or combinations thereof. Documents or reports can obtain their data from various sources such as flat files, comma separated values (CSV) files, spread sheets, databases and the like. Specialized applications such as report generating tools collate data from various databases and present it in a coherent manner as reports that help users to analyze and understand complex data. Reports are thus extensively used in presentations where a presenter summarizes the insights derived from the data and answers specific questions put to the presenter by closely reviewing or observing the reports. The users or audience of the presenter may in turn derive actionable insights from the data in the reports and from the answers provided by the presenter to their questions.

BRIEF DESCRIPTION OF DRAWINGS

Features of the present disclosure are illustrated by way of examples shown in the following figures. In the following figures, like numerals indicate like elements, in which:

FIG. 10 shows an example of a narrative advisor that can be used to provide the attributes for the generation of the narrations.

DETAILED DESCRIPTION

Figure 1:
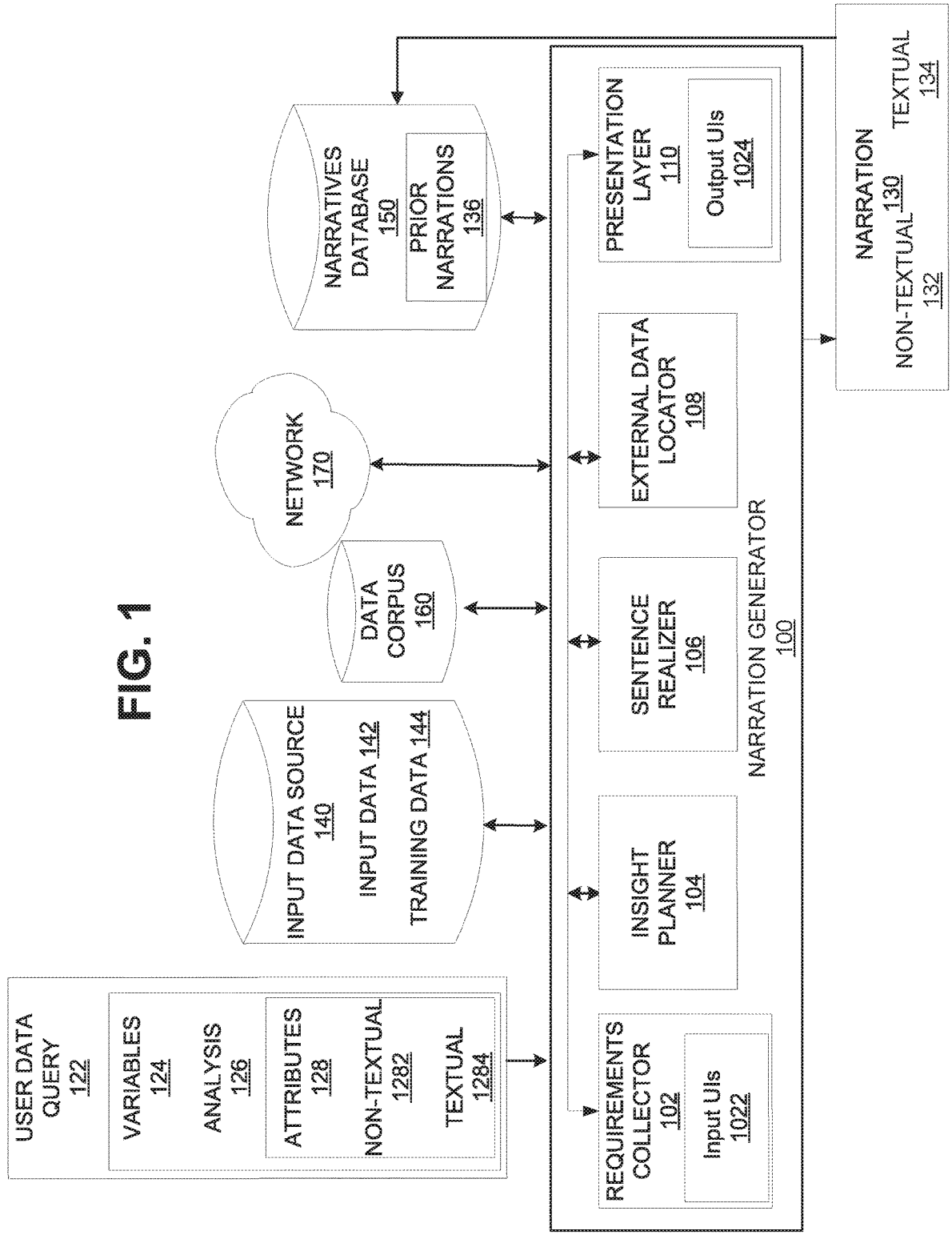
FIG. 1 shows a narration generator in accordance with one example.

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, a narration generator is described which receives inputs such as user data queries regarding information conveyed in the local data sources and external data sources and produces a narrative response or narration. The narrative response may convey the information requested by the user in both non-textual formats such as graphs and textual formats which may include sentences summarizing the trends in the graphs or responding to specific user queries in a few sentences that are automatically generated. The narration generator is therefore capable of accepting various data types as input such as but not limited to, numerical, textual, alpha-numerical and other data types that may be included in spreadsheets and databases as input, analyzing the data based on the keywords or variables and analysis types that are input by the user and providing insights in complete, human-readable and grammatically accurate sentences. Unlike automatically-generated machine translations which may include grammatically incorrect language or disjoint, broken sentences, the sentences generated by the narration generator are grammatically accurate and mimic those that would be provided by a human user summarizing the data trends or responding to specific queries.

The user data query therefore may include an identity of and access to input data sources that contain the information the user is interested in, the independent and dependent variables which are of interest to the user, the type of analysis the user desires to conduct on the variables and the various forms of response to be included in the narrative responses in which the user would like to have the information conveyed. The narration generator can include an input user interface such as a configuration screen that receives the user input including the variables, the interactions or relationships between the variables, values associated with the relationships, access to the data source and the type of analysis. In an example, the variables can include the various fields in the data source and the type of analysis can include various functions such as but not limited to, count, sum, unique count, standard deviation, average, median, percent, find and the like. The user input can also include whether or not the user desires a graphical representation of the data and if so, the type of graph the user desires.

An insight planner receives and parses the user data query to obtain the information required to generate the narrative response. In an example, the user data query may also include non-textual and textual attributes. While the non-textual attributes are used for constructing information elements in non-textual formats or non-textual portions of the narrative response such as graphs, the textual attributes may include names of variables, range of values and the like that are of interest to the user. The user data query may require the narration generator to pull the data from the external data sources that are outside of the input data sources. During the parsing, the textual attributes may also be parsed to obtain additional keywords or variables, their values, identify analysis types or specific external data sources to be used and the like.

Upon identifying the requisite elements from the user data query, the insight planner proceeds to build one or more intents. The intents can be used to automatically generate sentences that provide responses to the user data query. An intent may include name-value pairs that are obtained upon parsing the user data query. In an example, the keywords from the user data query may be variables in the intent while specific values input in the user data query or values obtained from the input data may serve as the values for building the user intent. The insight planner may additionally be configured to generate the non-textual portions of the narrative response. The intents built by the insight planner are transmitted to the other elements of the narration generator for the generation of a complete narrative response.

A sentence realizer receives the intent from the insight planner and uses the intent to automatically generate grammatically accurate sentences. The intents are fed to a sentence struct model which generates context free grammar (CFG) for composing one or more sentences. The sentence struct model is a recurrent neural networks (RNN) based on the long short term memory (LSTM) architecture. The sentence struct model is initially trained on data including sentences represented by their corresponding parts of speech (POS) tokens. The POS tokens in the generated CFG are replaced with words following a language model on top of which the intent supplied via the user query is stamped by replacing the placeholders thereby allowing to create paraphrases.

A presentation layer is also associated with the narration generator for displaying the generated narrative responses. In an example, the presentation layer may be configured with some pre-made templates for arranging the non-textual and textual portions of the narrative response. In an example, the narrative responses may be stored in a training database for training the models used in the sentence realizer. Users may also have the options of receiving the narrative responses emailed as attachments, links or saved to specific locations on a network.

Analysis of data and generation of visual aids such as graphs in conveying information from the data is very useful. However, people with expertise in a particular field or domain may be needed to interpret the graphs, identify the trends or highlight data points such as maximum/minimum values, averages, outliers and the like. The narration generator is configured to convey information from the raw data not only in terms of graphs but also provides insights from the raw data and external data sources via grammatically consistent sentences that are easy for a user to comprehend. The narration generator as described herein represents a technical improvement over existing systems that ingest data, copy text that is already composed or merely produce graphs from the data. The narration generator is able to accept as input, various data types such as numerical, textual and alpha-numerical data from local and external data sources, analyze the data per the user's specifications as conveyed in the user data query and produce not only graphs but textual summaries that are easy to read as they are grammatically accurate. The generation of CFG including sequences of POS tokens aids the narration generator in producing sentences with consistent grammar. Inclusion of data from external data sources helps provide the user with comprehensive information regarding a topic the user may be researching.

The goal of quantitative analysis of a data set is to analyze the data set to obtain specific information and to derive actionable items. FIG. 1 shows a narrative response generation interface or a narration generator 100 that analyzes input data 142 from an input data source 140 based on one or more user data query 122 and generates narrations or narrative responses that tell a story regarding the information conveyed by the input data 142. A narrative response 130 thus generated provides textual and non-textual responses to the user data query 122. A requirements collector 102 of the narration generator 100 receives the user data query 122, analyzes the user data query 122 to identify information such as the variables 124, analysis 126 and attributes 128 of the user data query 122. The information gathered from the user data query 122 is used in generating a narrative response 130 that delivers the information the user is looking for within the input data 142. The input data source 140 may include data sources such as but not limited to spreadsheets, database tables, comma separated files (CSVs) and the like. In an example, the input data source 140 may also include training data 144 that comprises templates to train a model for the automatic generation of textual content for the narrative response 130.

A narratives database 150 that stores the automatically generated narrative responses is communicatively coupled to the narration generator 100. The user may be looking for information such as maximum or minimum values for certain variables/entities, sum of values associated with the variables 124, specific attributes of the variables or entities and the like. Accordingly, the user can specify particular type of analysis 126 that is to be conducted in order to provide the requisite information in the narrative response 130. The attributes 128 of the user data query 122 can convey to the narration generator 100 the ways in which the requisite information can be delivered. Thus, the user data query 122 may include non-textual attributes 1282 which include whether or not the user wants graphs included in the narrative response 130 and if yes the types of graphs to be included. The user data query 122 can also include textual attributes 1284 which are conveyed to the requirements collector 122 as variable names, names of related variables, the value ranges of the variables which are of interest to the user and the like. In an example, natural language based questions can be optionally included in the query in order to enable an administrator of the narration generator 100 to confirm the information request conveyed by the user date query 122 is included in the narrative response 130. Moreover textual attributes 1284 may also include requests for information regarding entities from external data sources or sources outside of the input data source 140 such as the internet based data sources like YAHOO API, FACTIVA, or other user-specified websites and the like. By the way of illustration and not limitation, if the narrative response 130 is being generated from data of a clinical trial, the user may desire external information regarding an existing drug. Similarly, if the narration is being generated regarding a financial product, the user may desire external information regarding a rival financial product.

The user data query 122 which is thus generated and transmitted to narration generator 100 is reusable. When the user so desires, prior narrations 136 previously generated based on the input data 142 and stored in a narratives database 150 may also be used to provide one or more of the variables, analysis or attributes for the narration. In an example, the user data query 122 can be submitted via a user interface exposed by the narration generator 100.

The narrative response 130 which is automatically generated by the narration generator 100 in response to the user data query 122, therefore, includes information in non-textual 132 format such as the graphs specified in the non-textual attributes 1282 of the user data query 122. The narrative response 130 will also include textual information 134 which is composed of grammatically accurate sentences or paraphrases that concisely provide the information desired by the user as conveyed via one or more of the variables 124 and analysis 126 portions of the user data query 122 or/and conveyed by the textual attributes 1284. The sentences included in the textual information 134 of the narrative response 130 would convey the information to the user in a manner similar to the manner in which a human presenter may answer a listener's question as opposed to the disparate, disjointed machine-generated sentences obtained from automatic language processors such as machine translators. The sentences may either duplicate the information shown in the non-textual information 132 or may add new information to that already included in the non-textual information 132.

The information in the non-textual 134 and the textual 132 formats when put together in the narrative response 130 would produce a comprehensive story to the user data query 122. It can be appreciated that the grammatical accuracy of the narration generator 100 improves during the course of usage as the narration generator 100 is exposed to and trained on different types of sentence constructions in different contexts. As mentioned above, the narrative response 130 may also include information from external data sources outside of the input data source 140. Such information may be conveyed in the non-textual 132 format or the textual 134 format depending on its form of availability within the external data source.

The requirements collector 102 obtains the information from the user data query 122 and transmits it to the insight planner 104. Input user interfaces (UIs) 1022 that will be described infra, with various UI elements can be used to collect the required information from the user. In an example, the requirements collector 102 may parse the textual attributes 1284 of the user data query 122 and pass the resulting tokens. The insight planner 104 identifies the variables 124 and their values on which the analysis needs to be performed based on the input from the requirements collector 102. The type of analysis and the textual 1284 and non-textual attributes 1282 are also identified by the insight planner 104. In an example, the variables 124 include the names of column in the input data 142. The insight planner 104 also identifies additional variables that may be required to fully address the user data query 122. In an example, the insight planner 104 may additionally build the non-textual 132 elements of the narrative response 130 such as graphs.

The sentence realizer 106 obtains the variables 124, the analysis 126 and the attributes 128 specified in the user query 122 to compose a grammatically accurate textual 134 response to the user data query 122. Artificial intelligence techniques employing statistical models trained on data corpus 160 as detailed herein are employed to construct the sentences or paraphrases that comport with the rules of grammar which are then included within the textual response 134 of the narrative response 130. In an example, a plurality of paraphrases that form suitable responses may be composed and one of them may be selected, manually or automatically, for including within the textual response 134 of the narration. When combined with the graphs from the insight planner 104, the paraphrases constructed by the sentence realizer 106 can form a comprehensive response to the user data query 122.

When the user data query 122 includes a request for information from outside the input data source 140, the external data locator 108 access the external data sources via the network 170 to fetch the information. The user may specify particular data sources or the external data locator 108 may be configured to default to certain external resources. These may include specific websites, subscription portals, blogs, social media sites and the like. The external data locator 108 may maintain a library of the various external data sources. For example, the library may include data sources classified as financial, scientific, cultural or general data sources. Based on the input data 142, specific types of external data sources from the library may be selectively searched to address the user's need for external information.

The presentation layer 110 receives the non-textual 132 and the textual 134 information to include it within the narrative response 130. The non-textual 132 information may include graphs or other representations of the data while the textual 134 information includes not only the sentences from the sentence realizer 106 but also the information extracted by the external data locator 108. The presentation layer 110 may also include certain templates for organizing the non-textual 132 and the textual 134 information within the narrative response 130. The narrative response 130 may be stored to the narratives database 150 for user access and for training purposes. Access to the narrative response 130 may be provided via different modalities such as an output user interface 1024 associated with the narration generator 100, via emailing a link to the narrative response 130 stored on the narratives database 150 or via emailing a document including the narrative response 130 to the user. While the narration is shown to include both the non-textual 132 and the textual 134 portions, it can be appreciated that a narration may be generated which includes only one of the portions.

Figure 2:
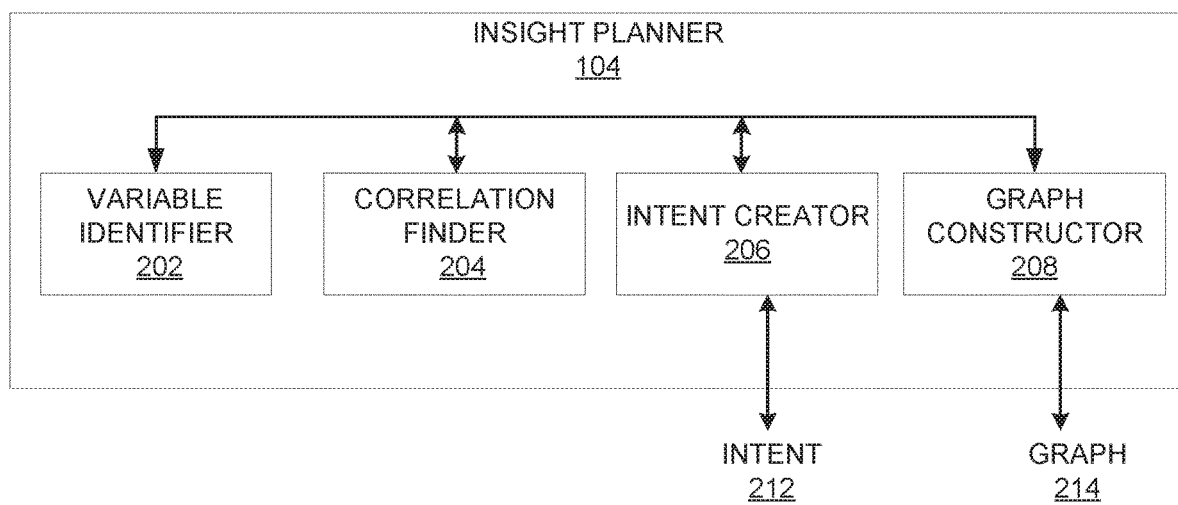
FIG. 2 shows a block diagram of an insight planner in accordance with an example.

FIG. 2 shows a block diagram of the insight planner 104 in accordance with an example. The insight planner 104 includes a variable identifier 202, a correlation finder 204, an intent creator 206 and a graph constructor 208. The variable identifier 202 identifies the variables within the user data query 122 and obtains their values from the input data 142 by accessing the input data source 140. In addition, the user's textual attributes 1284 may also include references to other related variables whose values may also have to be retrieved. The correlation finder 204 may be employed to identify such related variables and obtain the values from the input data 142. For example, if the input data 142 relates to a business process and the variable identifier 202 identified a variable pertaining to names of various banks. The textual attributes 1284 of the user data query 122 may include, for example, a request for global earnings in the current quarter for the various banks. Then the correlation finder 204 may automatically identify the related variable as the global earnings of the various banks in the current quarter.

An intent creator 206 receives the variables, related variables, values of the variables retrieved from the input data 142 and the analysis information from the user data query to generate an intent 212. The intent 212 is a set of name-value pairs that 122 includes the variable names and their respective values which are of interest to the user. The values may be provided explicitly by the user via a configuration user interface or implicitly via a type of analysis, such as but not limited to, a maximum/minimum value of a variable, median values, average values and the like. The intent 212 thus created can be used for not only the construction of non-textual portions of the narrative response 130 but may also be used for generating the textual portions 134 of the narration. The intent 212 is therefore shared with other elements of the narration generator 100 such as the sentence realizer 106 for enabling the generation of the narrative response 130. The graph constructor 208 receives the identities, values of the variables and the related variables, attributes 128 that specify the types of graphs 214 desired by the user. Based on the information from the user data query 122, the graph constructor 208 constructs graphs for the non-textual 132 portion of the narrative response 130.

Figure 3:
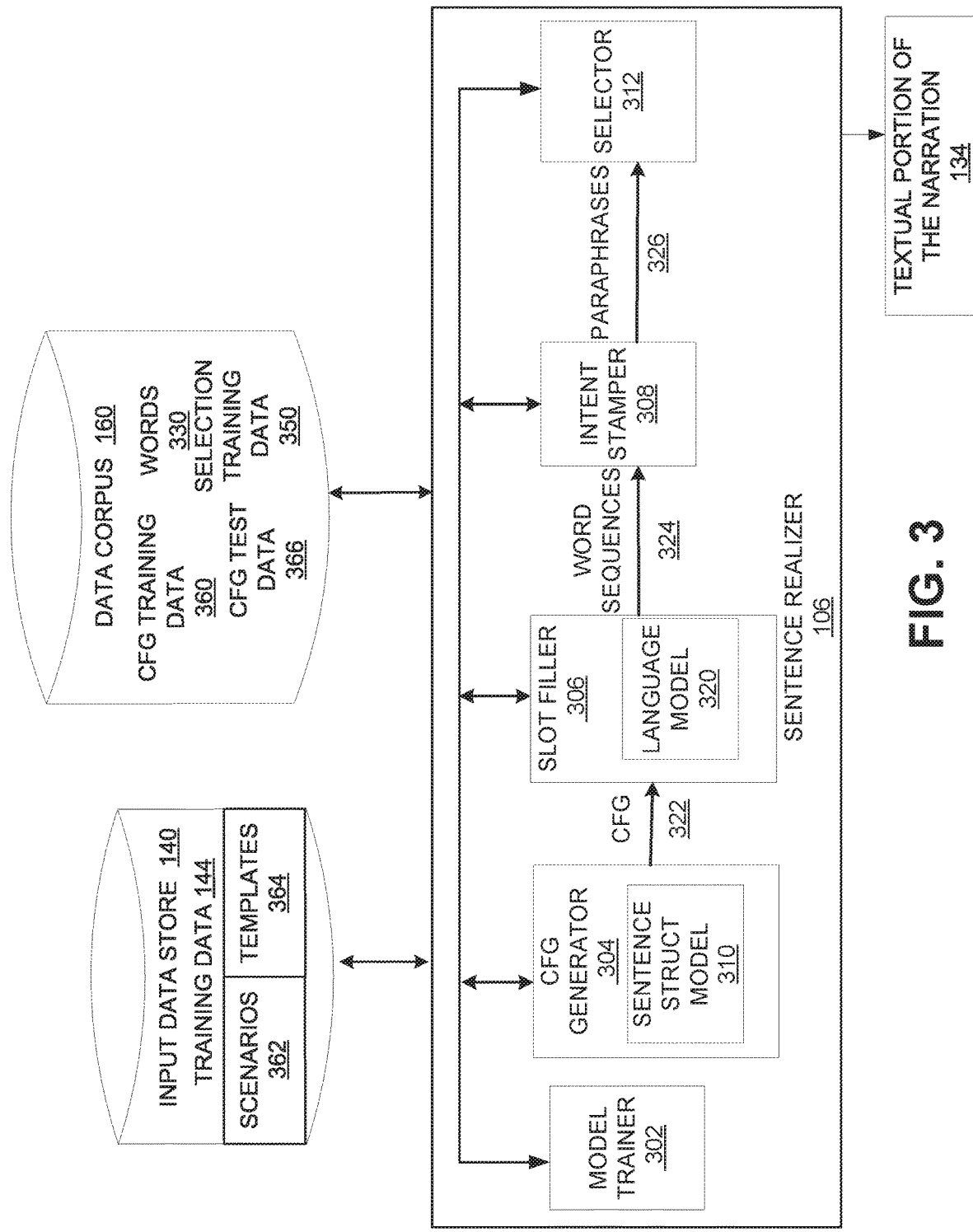
FIG. 3 is a block diagram of a sentence realizer in accordance with one example.

FIG. 3 is a block diagram of the sentence realizer 106 in accordance with one example. The sentence realizer 106 receives the intent 212 or information regarding the details of the user data query 122 such as the variables 124, related variables, analysis 126, textual attributes 1284 and the like from the insight planner 104. The details of the user data query 122 received by the sentence realizer 106 are used by the context free grammar (CFG) generator 304 to generate CFG 322 that forms the basis for sentences that will be included in the textual 134 portion of the narrative response 130. The CFG generator 304 employs a sentence struct model 310 to generate the CFG which is made up of tokens arranged in a particular sequence. Each token represents a part of speech (POS) so that the sequence of POS tokens represents a block structure of a given sentence consistent with the rules of grammar. Examples of CFG will be detailed further infra.

A model trainer 302 initially trains the sentence struct model 310 with templates from various possible scenarios 362 from the input data 142. A dataset with insights from various sources is initially compiled. The insights may include conclusions that can be gained from a data corpus. The insights are then classified into different scenarios 362 based on the data category of the input data 142. For example, if the input data 142 is business data the scenarios may include growth, loss, stagnant/stable, risky, turbulent and the like. If the input data 142 pertains to a scientific endeavor such as a clinical trial, the scenarios may include those for number of years survived, number of side effects, the severity of side effects, cost-benefit ratio and the like. Templates 364 of sentences that can be used to describe the various scenarios 362 possible with the input data 142 are also loaded into the input data source 140. Therefore, for each scenario, the sentence struct model 160 may be trained to enable generation of n number of semantically proper sentences based on the templates 364.

The CFG 322 formed sentence is a sequence of parts-of-speech (POS) tokens that correspond to the respective words of the sentence. Generation of CFG ensures that the sentences composed by the sentence realizer 106 comport with grammar rules but can have variations in structures while conveying the same meaning. This is in contrast to generating sentences directly from pre-determined templates wherein slots such as are later filled with user input which tends to produce repetitive text. In an example, the sentence struct model 310 may be a Recurrent Neural Network based on a Long Short Term Memory architecture (RNN-LSTM).

The CFG 322 from the CFG generator 304 is accessed by the slot filler 306 for filling slots or placeholders using the language model (LM) 320 thereby generating meaningful output that includes a sequence of words with placeholders 324 respectively for each of the CFG sequences generated by the CFG generator 304. The language model 320 may be a pre-trained model that was trained with a corpus of CFG and corresponding words in order to generate the word sequences 324. In an example, the slot filler 306 substitutes meaningful words selected via statistical procedures from the words corpus 330 that correspond to the part of the speech represented by the tokens in the CFG and arranged in the same sequence as the CFG tokens in order to generate a word sequence 324. While the word sequences 324 from the slot filler 306 are meaningful and human readable, the word sequences 324 do not yet constitute a grammatically consistent, complete textual response ready for inclusion in the narration This is because the word sequences 324 include representations for variables or variable names or placeholders that are later substituted with values from the input data 142 by the intent stamper 308 thereby generating a complete, meaningful and grammatically consistent sentence or paraphrase from each of the word sequences 324.

In an example, multiple paraphrases 326 may be generated by the intent stamper 308. The sentence realizer 106 includes a selector 312 to select one of the multiple paraphrases 326 for the textual portion 134 of the narrative response 130. The selection may be automatic wherein the selector 312 is trained on selection training data 350 which may include a corpus of sentences selected by the users and another corpus of sentences discarded by the users in order to delineate a sentence that will likely satisfy the user. In the case of automatic selection, all the paraphrases 326 may not be displayed to the user. However, the sentence realizer 106 also allows for manual selection from the paraphrases 326 wherein the user is able to access the plurality of paraphrases 326 and select one more of the paraphrases 326 for inclusion as part of the textual portion 134 of the narrative response 130. It may be noted that the textual portion 134 may include other information such as that provided by the external data locator 108.

An example of automatic generation of a paraphrase or sentence is discussed below. It can be appreciated that the example is discussed for illustration purposes only and is not intended to limit the claimed subject matter. Suppose the user's intent conveyed via the textual attributes 1284 is:

intent1={QCOMPANY: "XYZ Inc", QCOMPONENT: "Market share", QMONTH: "April", QRATE: "12%"}. The CFG generated for composing a paraphrase that forms a grammatically consistent response to the aforementioned intent is shown below:

NNP VBZ VBN NNP IN NNP IN JJ NNP.

In the CFG sequence shown above, each of NNP, VBZ, VBN, NNP, IN, NNP, IN, JJ and NNP is a token representing a part of speech of the word that should be substituted at the respective position in the sequence. For example, the token NNP represents a proper noun, VBZ represents a verb, VBN represents a present perfect verb, JJ represents an adjective and the like. When processed by the slot filler 306, the language model 320 replaces the tokens in the CFG with words. The language model 320 is trained on the corpus of words 330 to select a most appropriate word to replace a given token based on the statistical outcomes. Accordingly, when the CFG shown above is processed by the slot filler, the resulting paraphrase is:

QCOMPANY has gained QRATE in QMONTH in Total QCOMPONENT wherein QCOMPANY, QRATE, QMONTH and QCOMPONENT are representation of the variables or placeholders which are to be substituted with the intent1 as identified from the user data query 122. When stamped with intent1, the above sentence reads as:

XYZ INC. has gained 12% in April in Total Market share.

The above paraphrase may form a complete textual response to the request for information submitted by the user via the user data query 122. In an example, multiple such grammatically consistent sentences may be generated for manual or automatic selection as described supra.

Figure 4:
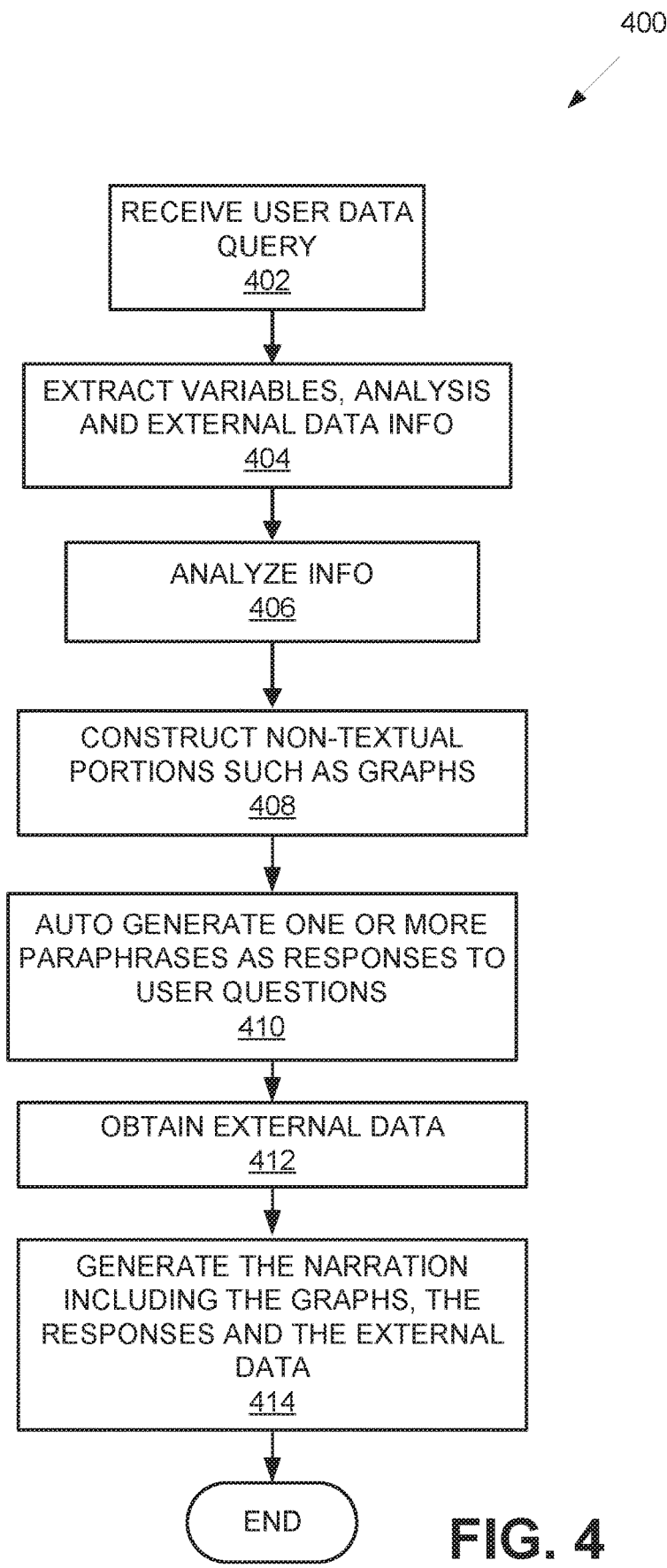
FIG. 4 is a flowchart that details an example method of generating a narration by the narration generator.

FIG. 4 is a flowchart 400 that details an example method of generating a narration by the narration generator 100. The method begins at 402 wherein a user data query 122 comprising the input data source 140 to be used for analysis, the variables 124 within the input data 142 to be analyzed, analysis 126, any external information which is desired outside of the input data source 140 and attributes 128. At 404, the information provided by the user such as the variables, ranges and the external data requirements are extracted, for example, by parsing the user data query 122. The extracted information is analyzed at 406 to identify the related variables, the type of analysis to be performed, the form of non-textual information requested by the user and the like.

The non-textual 132 portions of the narrative response 130 such as the graphs are constructed at 408. The user may desire to have the data presented as one or more of a bar graph, a line graph, a pie diagram and the like. At 410, the textual 134 portions of the narration such as paraphrases responding to the user's data query 122 are automatically generated. At 412, the external data requested by the user is obtained by accessing external data sources. The narrative response 130 including the non-textual 132 portion and the textual 134 portion is generated at 414.

Figure 5:
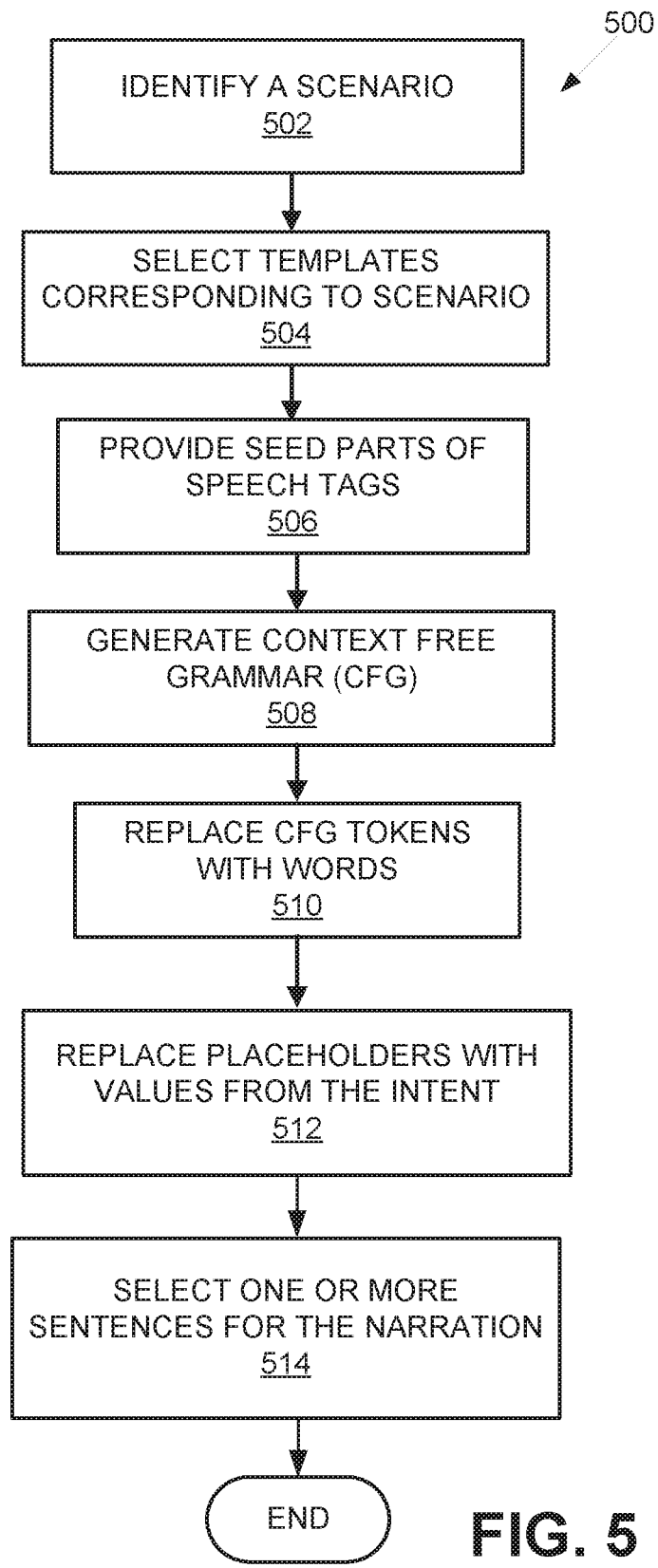
FIG. 5 is a flowchart that details a method of automatically generating paraphrases with consistent grammar.

FIG. 5 is a flowchart 500 that details a method of automatically generating sentences with consistent grammar for the textual 134 portion of the narrative response 130. The method, which may be executed by the sentence realizer 106, begins at 502 wherein a plurality of scenarios that are possible for the input data 142 are accessed and one of the scenarios that is indicated by the input data 142 is identified. As mentioned supra, the possible scenarios 362 are those that may be signaled by the data variations in the input data 142. In an example, the scenario may be identified from the analysis type 164 provided by the user. At 504, the templates 364 corresponding to the identified scenario are selected. The seed POS tags obtained from the user data query 122 are provided to the sentence struct model 310 at 506. The seed POS tags may include tags for nouns such as variable names, adjectives describing the type of analysis the user requires, verbs employed by the user in textual attributes 1284 and the like. At 508, the sentence struct model 310 generates the context free grammar for generating one or more sentences that comport with the rules of grammar. As mentioned above, the sentence struct model 310 is a RNN-LSTM data model which is trained via Deep Learning. Generation of CFG ensures that the paraphrases ultimately produced by the sentence realizer 106 will comport with the grammatical rules. For each paraphrase that can be generated, the sentence struct model 310 may generate one sequence of CFG tokens. Different sequences of CFG tokens are generated for composing different paraphrases for a given user intent. Referring again to the example of an automatically generated paraphrase above, a different CFG token sequence such as the one shown below may generate a different paraphrase:

NNP VBD NN IN NNP (NNP)

At 510, the CFG tokens in the CFG token sequences generated for each of the sentences are replaced with words from the words corpus 330 following the language model 320. The resulting word sequences 324 include both words and placeholders which may include variable names. A given CFG token sequence may therefore be converted into a word sequence by substituting appropriate words from the words corpus 330 for various parts of speech and using placeholders at positions corresponding to the nouns. For example, the noun tokens (NNP) from the CFG sequence shown above are replaced with placeholders when converted to a word sequence 324. When replaced with words the above sequence of CFG tokens forms a word sequence:

QMONTH increased volume for QCOMPANY (QRATE)

The placeholders in the various word sequences 324 are substituted with values from the intent by the intent stamper 308 at 512. One or more complete paraphrases providing grammatically consistent answers to the user's queries are thereby generated. For example, when the placeholders QMONTH, QCOMPANY and QRATE within the paraphrase shown above are replaced with the appropriate values from the user data query 122, the resulting sentence will read as:

April increased volume for XYZ Inc (12%)

The sentence realizer 106 can thus generate multiple paraphrases 326 for the same intent. However, all the paraphrases 326 will be grammatically accurate as they are based on CFG. At 514, one or more of the paraphrases 326 may be selected for including in the textual portion of the narrative response 130.

Figure 6:
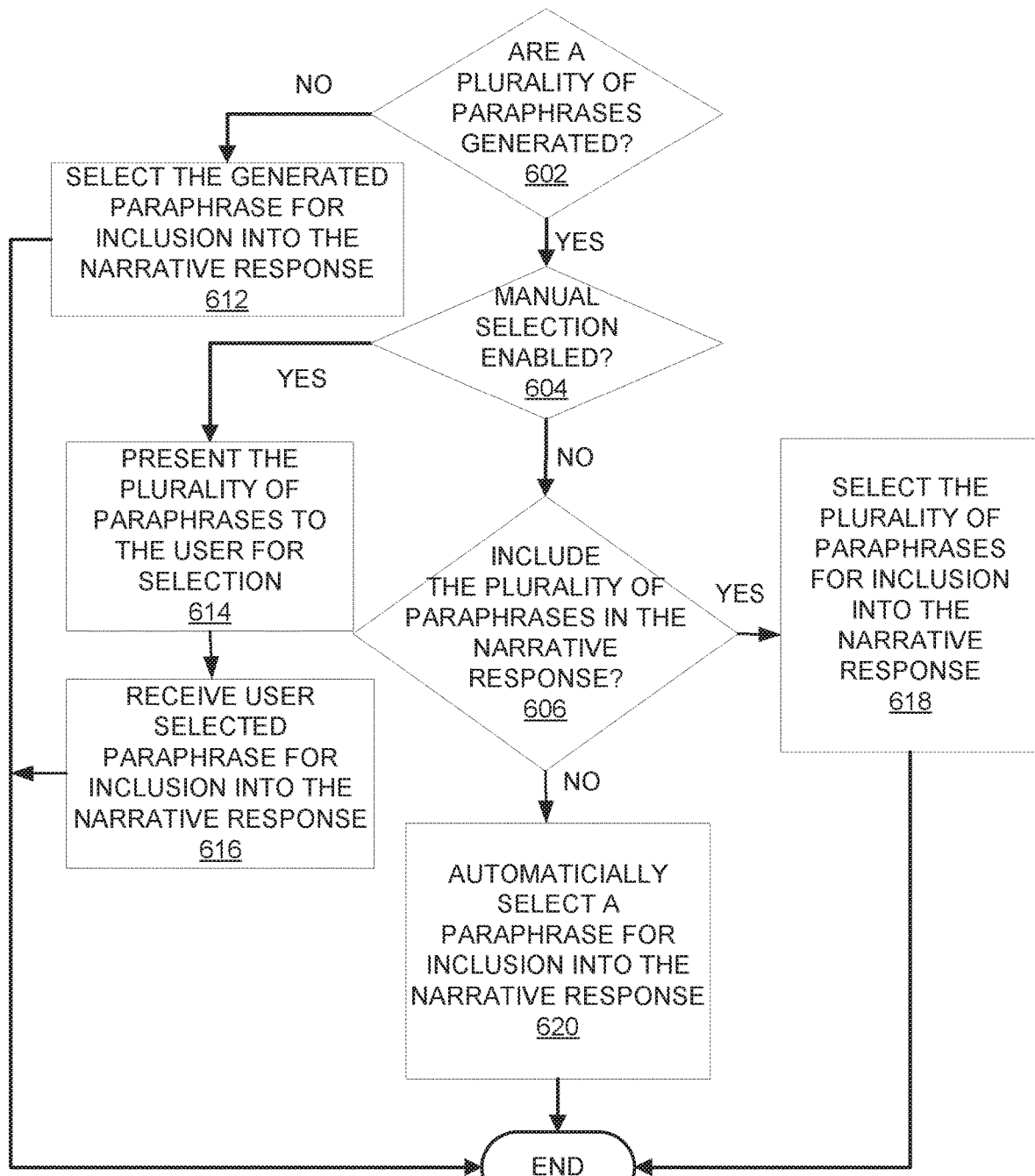
FIG. 6 is a flowchart that details a method of selecting paraphrases in accordance with one example.

FIG. 6 is a flowchart 600 that details a method of selecting paraphrases as implemented by the selector 312 in accordance with one example. The method begins at 602 wherein it is determined if a plurality of paraphrases were generated. If only one paraphrase is generated, the method moves to 612 wherein the generated paraphrase is selected for including in the narrative response 130 and the method terminates on the end block. If at 602 it is determined that a plurality of paraphrases were generated, at 604 it is determined if manual selection of paraphrases is enabled. If it is determined at 604 that manual selection is enabled, then the plurality of paraphrases 326 are presented to the user at 614 for the user selection and the user selected paraphrase is received at 616 for inclusion into the narration. If it is determined at 604 that manual selection is not enabled, the selector 312 may be employed for automatic selection. Accordingly, the method moves to 606 wherein it is determined if the plurality of paraphrases are to be included within the narrative response 130. A plurality of paraphrases may be included in the narration, if for example, the user has posed multiple questions in the user data query 122 or if the answer to the user data query 122 can only be provided in a plurality of paraphrases. If it is determined at 606 that all the plurality of paraphrases are to be included, then the method moves to 618 to select the plurality of paraphrases for the narrative response 130 and terminates on the end block. If it is determined at 606 that a subset of the plurality of paraphrases provide adequate response to the user data query 122, the method moves to 620 wherein a subset of the paraphrases are automatically selected for inclusion into the narrative response 130 and the method terminates on the end block.

Figure 7:
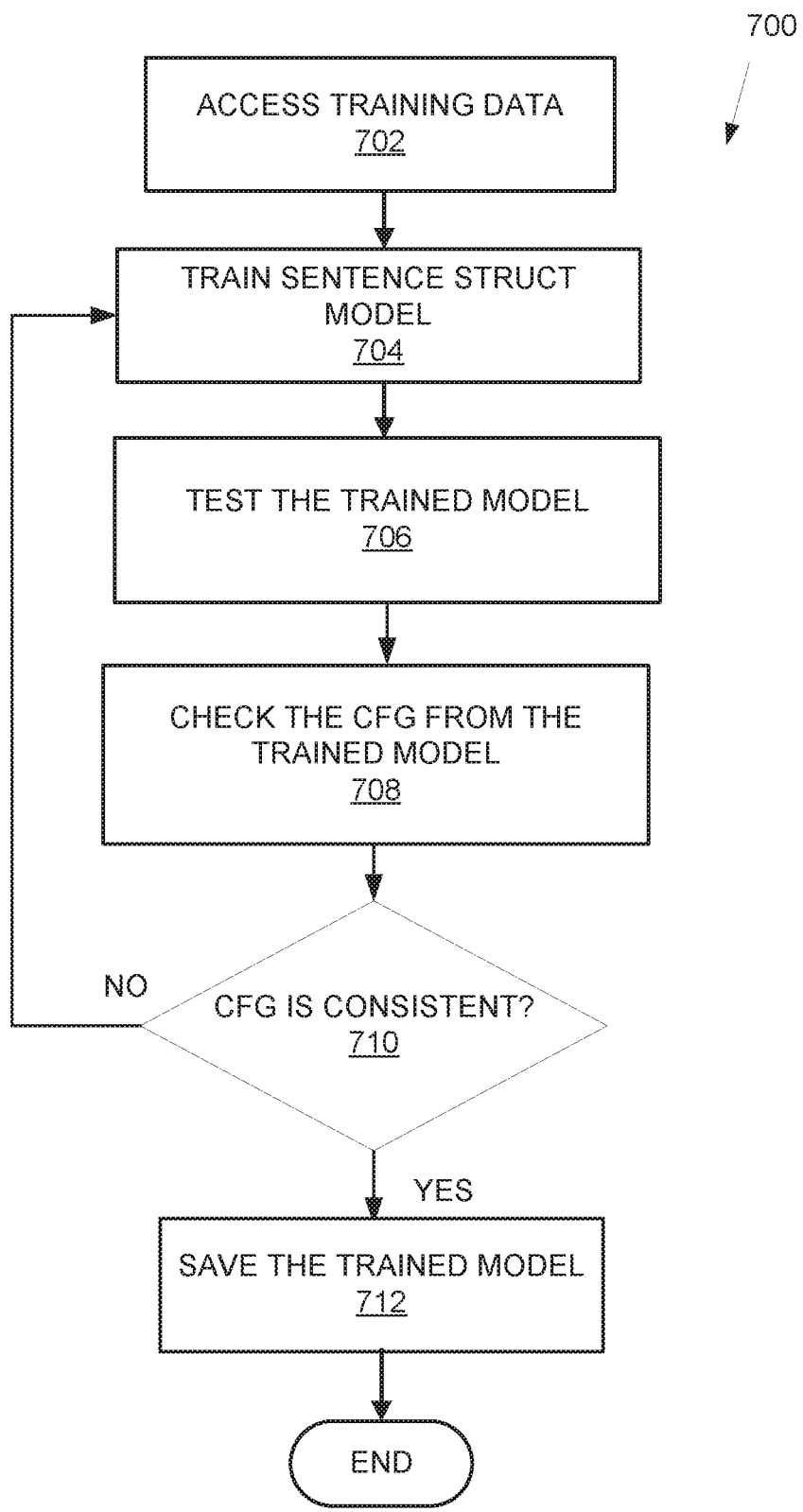
FIG. 7 is a flowchart that details a method of training the sentence struct model.

FIG. 7 is a flowchart 700 that details a method of training the sentence struct model 310 to generate the CFG in accordance with one example. As mentioned supra, the sentence struct model 310 is a RNN with LSTM architecture trained via Deep Learning techniques. An RNN is a type of artificial neural network designed to recognize patterns in data sequences. The decision an RNN reached at time step t-1 affects the decision it will reach one moment later at time step t, hence, RNNs are said to have memory. RNNs therefore use information in the sequence itself to perform tasks. The sequential information is preserved in the recurrent network's hidden state, which manages to span many time steps as it cascades forward to affect the processing of each new example. An LSTM network is an RNN that is particularly suited to learn from experience to classify, process and predict time series when there are time lags of unknown size and bound between important events. In an example, an RNN-LSTM which forms the sentence struct model 310 can be represented as:

$$h_t = \sigma(W_{hh}h_{t-1} + W_{xh}x_t + b_h) \quad \text{Eq. (1)}$$

$$\hat{y}_t = W_{hy}h_t \quad \text{Eq. (2)}$$

where, X is an input layer (matrix) containing features vectors$\{x_1, x_2, \ldots x_n\}$ at some known time, H is a Hidden layer (matrix) with nodes $\{h_1, h_2, \ldots h_m\}$ at some known time, $h_{1t}$ is Node 1 in hidden layer H at time step t. Subsequently t−1 stands for previous time step. In the training equation only a general case is shown omitting node number (as in 1 in Eq. (1)).

$W_{xh}$ are connection weights between input layer and hidden layer, $W_{hh}$ are connection weights between hidden layer and its own previous state, $W_{hy}$ are connection weights between hidden and output layer, $b_h$ is a bias term of hidden layer, σ is a nonlinear Activation function such as Softmax, Y is the output layer with nodes $\{y_1, y_2\}$ for a 2 class problem at some known time, and ŷ is the predicted output vector.

The method for training the sentence struct model 310 begins at 702 with the model trainer 302 accessing CFG training data 360 from the data corpus 160 which includes grammatically accurate sentences represented by their respective CFG token sequences wherein each token in a sequence corresponds to a word in the sentence. At 704, the sentence struct model 310 is trained on the CFG training data 360 and the sentence struct model 310 is then tested at 706 using the CFG test data 366. The CFG test data 366 may include sample sentences for which the CFG token sequences are generated by the trained sentence struct model 310. The CFG generated by the sentence struct model 310 is checked at 708 for consistency. It is determined at 710 if the CFG generated by the sentence struct model 310 is consistent. If it is determined at 710 that the CFG generated by the sentence struct model 310 is inconsistent, the method returns to 704 for further training the sentence struct model 310. If it is determined at 710 that the CFG generated by the sentence struct model 310 for the CFG test data 266 is consistent, the sentence struct model 310 is saved at 712 for use with the narration generator 100 and the method terminates on the end block. It can be appreciated that each use of the sentence struct model 310 can be considered as a training session due to the feedback nature of the RNN-LSTM.

Various user interfaces such as the input UIs 1022, output UIs 1024, sample narrations and configuration screens used by the narration generator 100 are discussed below. Some of the input UIs 1022 such as the home page and configuration screen may be put forth by the requirements collector 102 while the output UIs 1024 such as those providing access to the sample reports may be included in the presentation layer 110. While the user interfaces are discussed below with respect to a certain data category, it can be appreciated that the narration generator 100 as described herein is not limited to any data category. The narration generator 100 is capable of analyzing various data categories such as but not limited to financial, scientific, social media and the like and automatically generating natural language-based, grammatically accurate sentences to users' queries.

Figure 8:
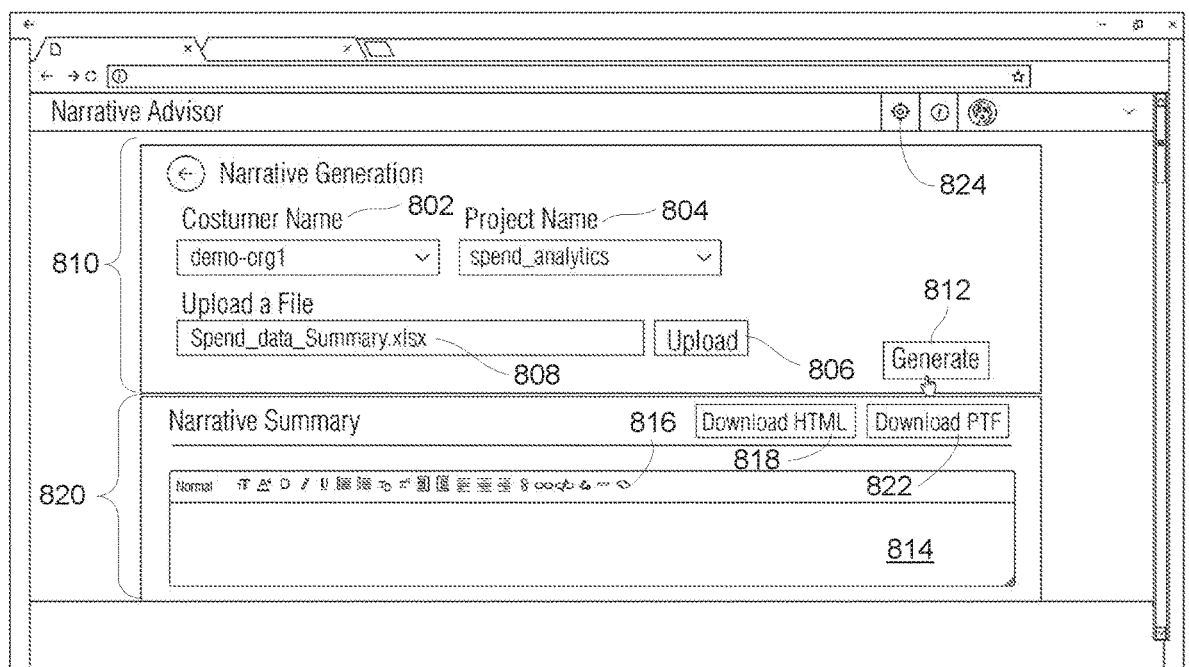
FIG. 8 shows a home page of the narration generator.

FIG. 8 shows a home page 800 of the narration generator 100. The home page is made up of two portions wherein the upper portion 810 pertains to generating a narration while a lower portion 820 shows the generated narrations. The upper portion 810 includes a customer name box 802 for selecting a customer associated with the input data 142 that will be used by the narration generator 100 for analysis. The project name box 804 enables selecting a project associated with the input data 142 and the narrations to be generated from a plurality of projects associated with the customer selected from the customer name box 802. The upload button 806 when pressed, opens an explorer window associated with the input data source 140 from which a file including the input data 142 may be selected. The selected file is displayed in the file selection box 808. A settings widget 824 enables the user to access a configuration screen that can be used to provide the various attributes 128. The details of the configuration screen will be discussed further infra with respect to some examples. The generate button 812 is activated in order to create a narration from the input data 142. As seen from the home page 800, a narration for a project "spend_analytics" is being generated for a customer "demo org" from an input data source which, in this example is a spreadsheet "Spend_data_summary.xlsx".

The narrative response 130 that is created upon activating the generate button 812 is shown in the lower portion 820 of the home page 800. The non-textual 132 and the textual 134 portions of the narrative response 130 are displayed in the document interface 814. A formatting toolbar 816 allows formatting of the textual portion 134 of the narrative response 130. The 'download html' 818 and 'download pdf' 822 buttons allow downloading the narrative response 130 in html or pdf formats respectively. The narration generator 100 may also be enabled to automatically email a copy of or a link to the html or pdf versions of the narration.

Figure 9A:
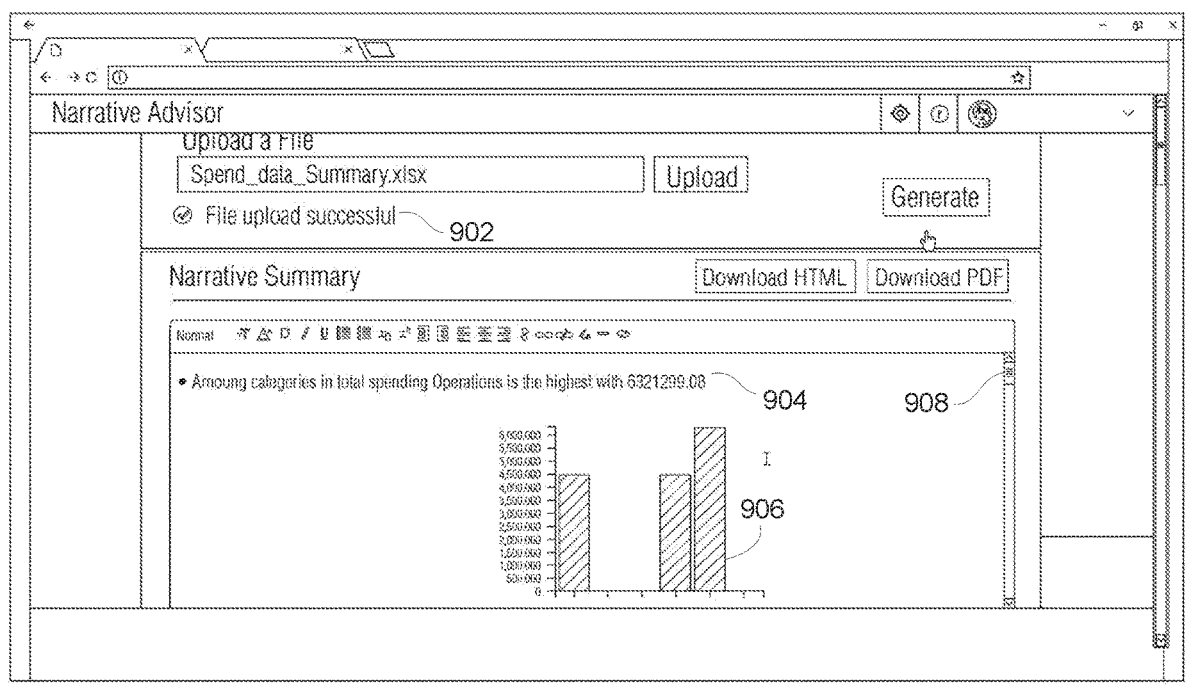
FIG. 9A illustrates a narration or a narrative response that is generated by the narration generator.

FIG. 9A illustrates a narration that is generated for the spend_analytics project when the generate button 812 was clicked. While generating the narration in FIG. 8, the narration generator 100 initially attempts to access the input data 142 which, in the above example, is the Spend_data_summary.xlsx file. Upon successfully accessing the input data source 140, the narration generator 100 outputs a message 902 informing the user of the success. The resulting narration includes multiple graphs and automatically-generated textual portions providing responses to the user's queries. A scrollbar 908 enables the user to scroll through the multiple graphs and their related text portions. A bar graph 906 and the related text 904 which was automatically generated are displayed in FIG. 9A. In this example, the text 904 summarizes the information conveyed by the bar graph 906 that among the various categories, Operations has the highest total spending with $6,321,299.08.

Figure 9B:
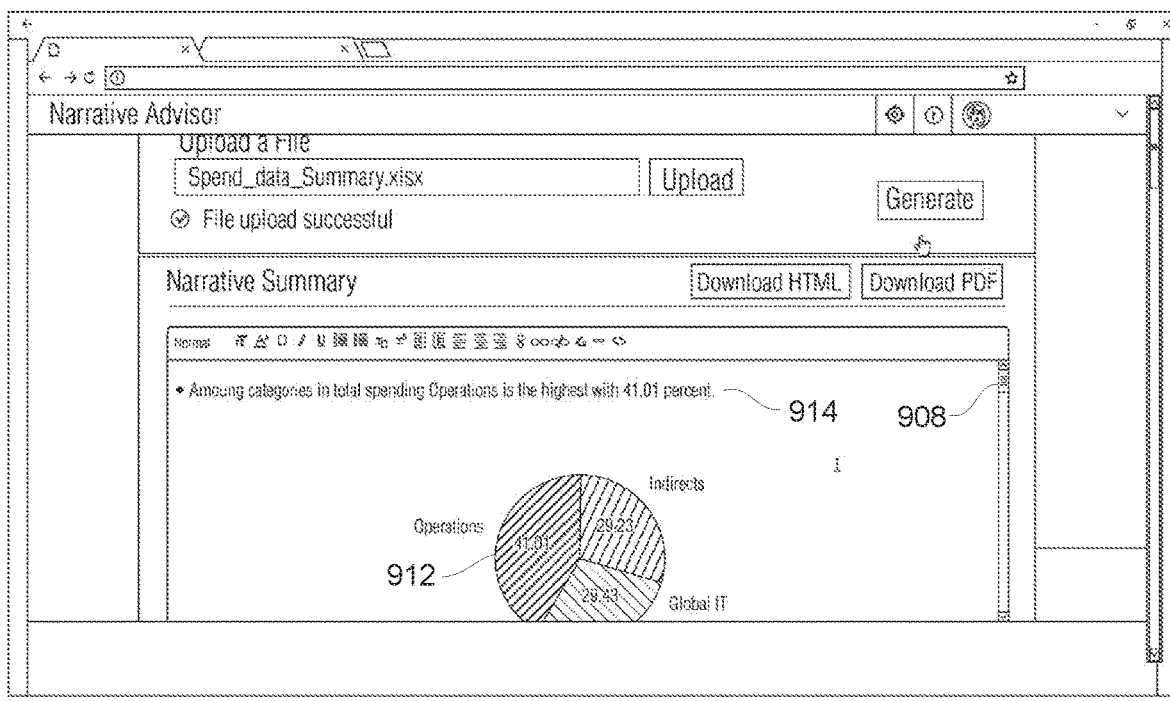
FIG. 9B illustrates a continuation of the narration shown in FIG. 9A.

FIG. 9B illustrates a continuation of the narration shown in FIG. 9A. Upon scrolling further down the narration, another graph in the form of a pie diagram 912 is displayed along with the relevant text 914 by the narration generated from the spend_analytics project. FIG. 9B conveys in terms of percentages the information conveyed by FIG. 9A in terms of absolute numbers. Similar to FIG. 9A, the relevant text 914 summarizes the information conveyed by the pie diagram 912 that Operations has the highest total spending. Thus, within the same narration, different types of graphs conveying different information may be generated from the same data source. In an example, the user interface displaying the narrations may include widgets for editing and deleting narrations. Editing a narrative response may require the user to edit the user data query 122 via a narrative advisor.

FIG. 10 shows an example of a narrative advisor 1000 that can be used to provide the attributes 128 for the generation of the narrations. The narrative advisor 1000 can be accessed via the settings widget 824 on the home page 800. The narrative advisor 1000 includes an insight planner tab 1002 that allows the user to configure intents from which the narrations are generated, a learning module tab 1004 which enables the user to provide data such as the user's intent and the external data tab 1006 that the user can employ to configure the data sources to be used from outside of the input data source 140. Similar to the home page 800, the narrative advisor 1000 also includes the file selection box 808 with a browse button 1008. The narrative advisor 1000 further includes an Add Data section 1210 which allows the users to select variables, provide values, analysis details and other attributes 128.

Figure 11:
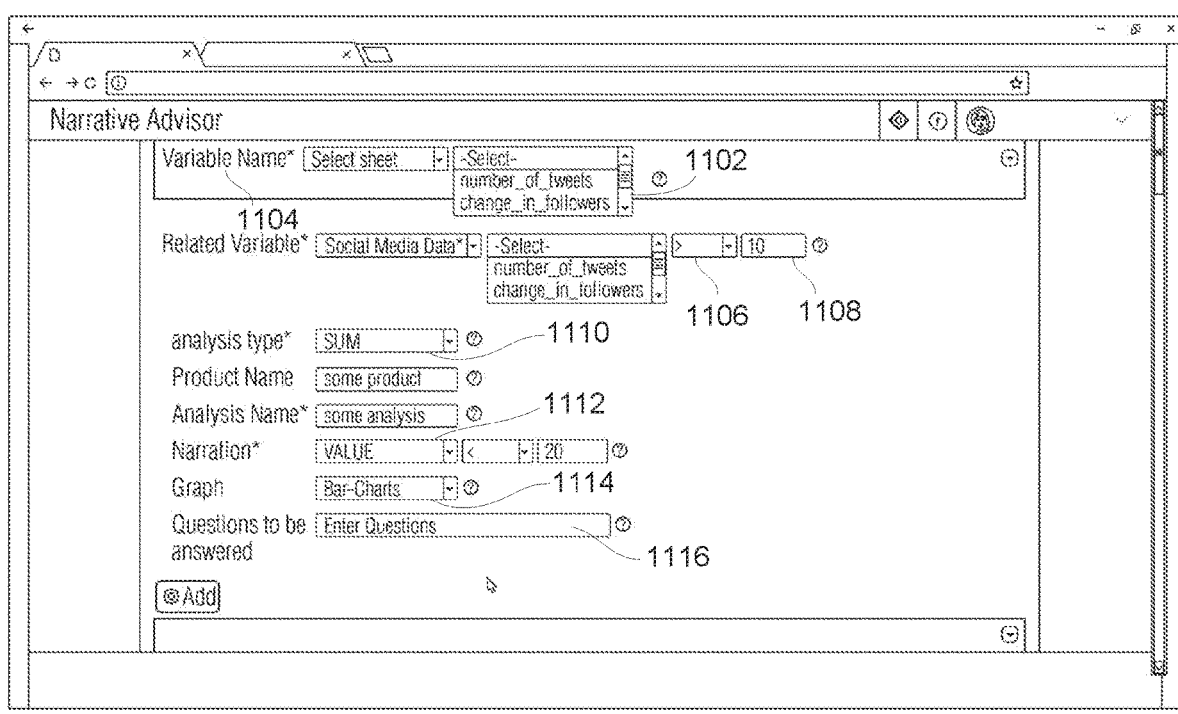
FIG. 11 shows the details of the Add Data section in accordance with one example.

FIG. 11 shows the details of the Add Data section 1010 in accordance with one example. As seen from the narrative advisor 1000, narrations of the social media project of the demo org are being configured using a data source labelled Social Media Data. The Add Data section 1010 includes a variables list box 1102 that allows the user to select one or more variables from the Social Media Data. In FIG. 11, the user selects number_of_tweets as one of the variables to be analyzed for the narration. The analysis type list box 1110 lists the possible types of analysis that are desired by the user and which can be executed on the input data 142 for generating the narrations. By the way of illustration and not limitation, the types of analysis that can be executed on the values of the variable selected in the variable name list box such as count, sum, average, percentage, standard deviation, count unique, find and the like are listed in the analysis type list box 1110.

A related variable list box 1104 allows the user to select a related variable such as the change_in_followers from the Social Media Data. The text box 1106 allows the user to filter values by inserting equality/inequality symbols and the value box 1108 allows the user to enter numerical criterial. Accordingly, the user selects all those rows from the Social Media Data wherein the change_in_followers have values greater than 10 for generating the narration. The narrations list box 1112 allows the user to select a narration that will provide information obtained from the analysis of the variable values selected in the variables list box 1102 and the related variable values selected via the related variable list box 1104. In the example shown in FIG. 11, the user selects to generate a narration of value type wherein the value is less than 20. By the way of illustration and not limitation, the narrations list box 1112 allows narrations for highest value, the lowest value, comparison, comparison between the highest and lowest values, distribution, direction trend, comparison of particular value, total particular value, percentage interested value, median, unique and summary value. It can be appreciated that the contents of the analysis types list box 1110 and the narrations list box 1112 are listed herein only for example and that the listed analysis types or narrations can vary depending on various factors such as the project for which the narrations are generated, the type of data in the input data 142, and the like.

The graphs list box 1114 shows the various types of graphs that can be generated. For example, bar graphs, line graphs, pie diagrams and the like may be selected from the graphs list box 1114. The question text box 1116 allows the user to query for additional information via inputting a question in natural language. For example, the user may input a question for analysis types that are not listed in the analysis type list box 1110. In another example, the user may input a question that requires information from the input data 142 and data obtained from an external data source which was specified under the external data tab 1006. The information provided to the narration generator 100 via the narrative advisor 1000 is analyzed by the insight planner 104 to generate an intent which is provided to one or more of the sentence realizer 106, external data locator 108 and the presentation layer 110 for the generation of the narrative response 130.

Figure 12:
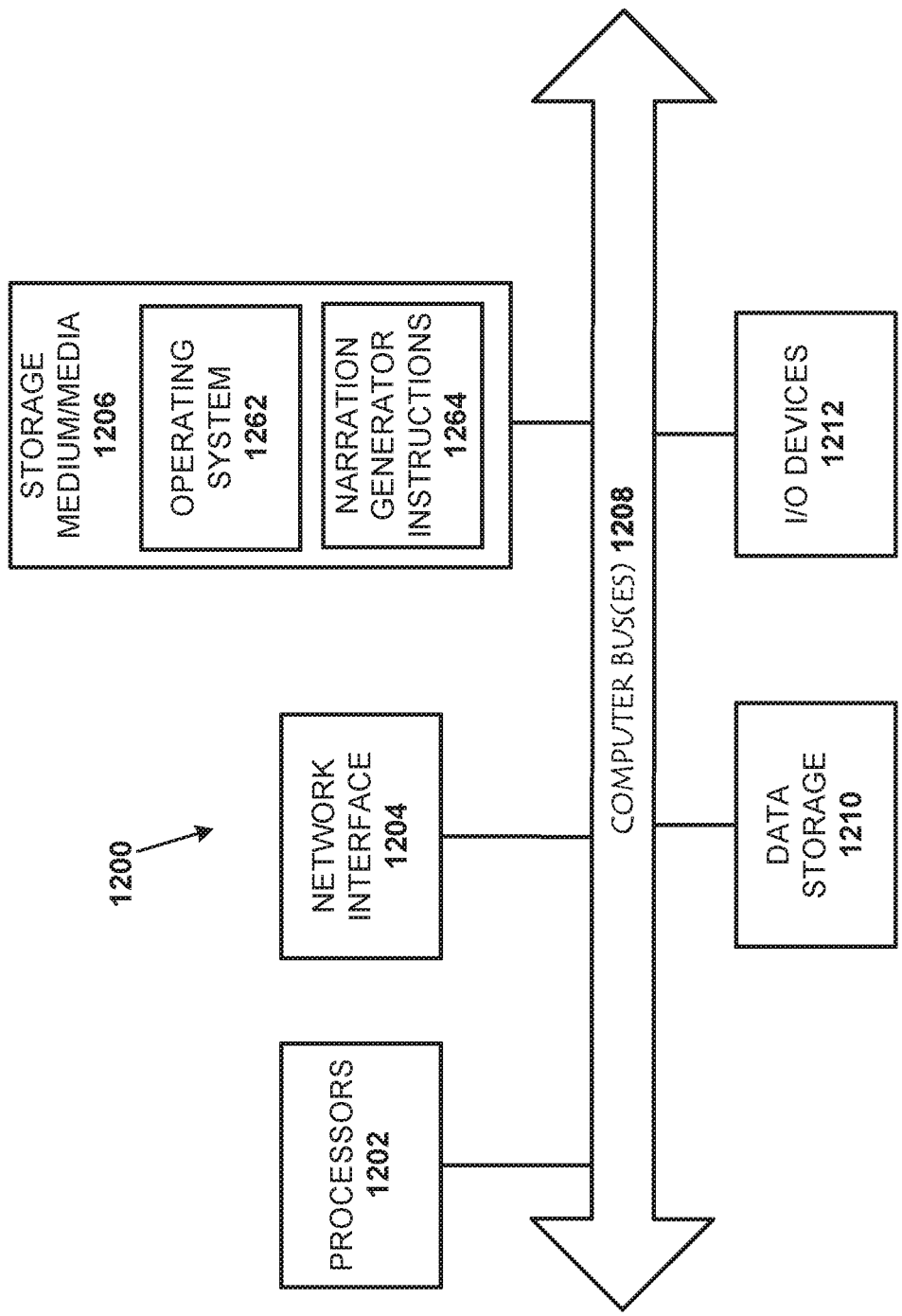
FIG. 12 is a block diagram that illustrates an example of a computer system for implementing the narration generator.

FIG. 12 illustrates a computer system 1200 that may be used to implement the narration generator 100. More particularly, computing machines such as desktops, laptops, smartphones, tablets, wearables which may be used to generate or access the reports may have the structure of the computer system 1200. The computer system 1200 may include additional components not shown and that some of the components described may be removed and/or modified.

The computer system 1200 includes processor(s) 1202, such as a central processing unit, ASIC or other type of processing circuit, input/output devices 1212, such as a display, mouse keyboard, etc., a network interface 1204, such as a Local Area Network (LAN), a wireless 1202.11x LAN, a 3G or 4G mobile WAN or a WiMax WAN, and a computer-readable medium 1206. Each of these components may be operatively coupled to a bus 1208. The computer readable medium 1206 may be any suitable medium which participates in providing instructions to the processor(s) 1202 for execution. For example, the computer readable medium 1206 may be non-transitory or non-volatile medium, such as a magnetic disk or solid-state non-volatile memory or volatile medium such as RAM. The instructions or modules stored on the computer readable medium 1206 may include machine readable instructions 1264 executed by the processor(s) 1202 to perform the methods and functions of the narration generator 100.

The narration generator 100 may be implemented as software stored on a non-transitory computer readable medium and executed by one or more processors. For example, the computer readable medium 1206 may store an operating system 1262, such as MAC OS, MS WINDOWS, UNIX, or LINUX, and code 1264 for the narration generator 100. The operating system 1262 may be multi-user, multi-processing, multitasking, multithreading, real-time and the like. For example, during runtime, the operating system 1262 is running and the code for the narration generator 100 is executed by the processor(s) 1202.

The computer system 1200 may include a data storage 1210, which may include non-volatile data storage. The data storage 1210 stores any data used by the narration generator 100. The data storage 1210 may be used to store real-time data from the narration generation processes to provide the automatically generated sentences for user review during manual selection and the like.

The network interface 1204 connects the computer system 1200 to internal systems for example, via a LAN. Also, the network interface 1204 may connect the computer system 1200 to the Internet. For example, the computer system 1200 may connect to web browsers and other external applications and systems via the network interface 1204.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A narrative response generation interface, comprising:
   one or more processors; and
   a non-transitory data storage comprising instructions that cause the processors to:
   train a sentence struct model to generate context free grammar (CFG), wherein the sentence struct model is trained on CFG training data that includes grammatically accurate sentences and corresponding CFG including parts of speech (POS) token sequences of the grammatically accurate sentences;

receive a user data query providing access to one or more data sources and comprising keywords that include variable names and corresponding values for use in generating at least one narrative response, the narrative response comprising a textual portion conveying at least a first portion of a user desired information from the one or more data sources in textual format framed in natural language and a non-textual portion conveying a second portion of the user-desired information in non-textual format;

generate an intent that enables producing the textual portion, the intent comprising name-value pairs obtained from the user data query;

produce the non-textual portion of the narrative response based on input data from one or more data sources;

input at least the name-value pairs to the sentence struct model trained to generate the CFG;

generate, by the sentence struct model, the CFG based at least on the name-value pairs, the CFG providing at least one template comprising a sequence of POS tokens;

replace the POS tokens in the at least one template with words and placeholders to form at least one word sequence, the placeholders comprising the variable names that are to receive the corresponding values from the intent;

stamp the intent on the at least one word sequence by replacing the placeholders with respective values to generate at least one grammatically accurate paraphrase; and generate the narrative response to comprise the non-textual portion and the at least one grammatically accurate paraphrase as the textual portion.

2. The narrative response generation interface of claim 1, the instructions to receive the user data query comprising instructions that cause the processors to:
receive within the user data query, access to information from external data sources that are outside of the one or more data sources;
access the external data sources to retrieve the information from the external data sources requested with the user data query; and
include the information retrieved from the external data sources in one or more of the textual portion or the non-textual portion of the narrative response.

3. The narrative response generation interface of claim 1, the instructions to receive the user data query comprising instructions that cause the processors to:
receive within the user data query, a type of analysis associated with the variables from the data sources.

4. The narrative response generation interface of claim 1, the instructions to receive a user data query further comprising instructions that cause the processors to:
receive a request for information framed in a natural-language.

5. The narrative response generation interface of claim 1, the instructions to produce the non-textual portion further comprising instructions that cause the processors to:
generate one or more graphs requested by the user in the user data query.

6. The narrative response generation interface, of claim 1, wherein the sentence struct model comprises a Recurrent Neural Network based on Long Short Term Memory architecture (RNN-LSTM).

7. The narrative response generation interface, of claim 1, the instructions to generate the CFG that provides at least one template comprising the sequence of POS tokens further comprising instructions that cause the processors to:
generate the CFG including a plurality of templates, each template comprising a sequence of POS tokens different from other sequences of POS tokens respectively corresponding to other templates.

8. The narrative response generation interface of claim 7, the instructions to generate the at least one grammatically accurate paraphrase further comprising instructions that cause the processors to:
form a plurality of word sequences respectively corresponding to the plurality of templates; and
stamp the intent on the plurality of word sequences by replacing the placeholders in each of the word sequences with the corresponding values from the intent to generate a plurality of grammatically accurate paraphrases that respectively correspond to the plurality of word sequences.

9. The narrative response generation interface of claim 8, further comprising instructions that cause the processors to:
select one or more of the plurality of grammatically accurate paraphrases for inclusion into the narrative response.

10. The narrative response generation interface of claim 9, the instructions for selecting one or more of the plurality of grammatically accurate paraphrases further comprising instructions that cause the processors to:
automatically select one or more of the plurality of grammatically accurate paraphrases for inclusion into the narrative response.

11. The narrative response generation interface, of claim 1, wherein one or more of the grammatically accurate sentences in the CFG training data are used to describe a scenario of a plurality of scenarios, wherein the plurality of scenarios are classified based on a data category associated with the user data query.

12. The narrative response generation interface of claim 1, wherein each POS token of the POS token sequences corresponds to a word of the grammatically accurate sentences.

13. A method comprising:
training a sentence struct model to generate context free grammar (CFG), wherein the sentence struct model is trained on CFG training data that includes grammatically accurate sentences and corresponding CFG including parts of speech (POS) token sequences of the grammatically accurate sentences;
receiving a user data query for information, the user data query comprising one or more variable names and corresponding values and at least one type of data analysis to be performed;
accessing data responsive to the user data query from one or more data sources, the data sources comprising local data sources and external data sources;
generating a non-textual portion of a narrative response from one or more of the local data sources and the external data sources;
providing at least the variable names and the corresponding values to the sentence struct model that is trained to generate the CFG from variables associated with the one or more variable names;

composing, by the sentence struct model the CFG based at least on the one or more variable names and the corresponding values, wherein the CFG comprises a plurality of templates to be used for generating one or more grammatically accurate sentences for a textual portion of the narrative response, the plurality of templates comprising respective sequences of POS tokens;

identifying by a language model, words and placeholders to respectively replace each of the POS tokens in the plurality of templates;

substituting the placeholders with the corresponding values of the variables supplied by the user data query to form a plurality of grammatically accurate paraphrases for the plurality of templates;

providing access to the plurality of grammatically accurate paraphrases to a user for manual selection;

receiving the user selection of one or more of the plurality of grammatically accurate paraphrases for inclusion into the narrative response;

recording the user selection of the one or more of the plurality of grammatically accurate paraphrases for the training; and generating the narrative response to the user data query, the narrative response including at least the non-textual portion and the textual portion comprising the one or more grammatically accurate paraphrases.

14. The method of claim 13, wherein accessing the data responsive to the user data query from the one or more data sources further comprises:

accessing data from one or more external Internet-based websites.

15. The method of claim 14, wherein, generating the narrative response to the user data query further comprises:

including information selected from the one or more external Internet-based websites into one or more of the non-textual portion and the textual portion of the narrative response.

16. The method of claim 13, wherein generating the non-textual portion of the narrative response further comprises:

receiving non-textual attributes describing one or more graphs desired by the user; and including the graphs desired by the user in the non-textual portion of the narrative response.

17. A non-transitory computer-readable storage medium comprising machine-readable instructions that cause a processor to:

train a sentence struct model to generate context free grammar (CFG), wherein the sentence struct model is trained on CFG training data that includes grammatically accurate sentences and corresponding CFG including parts of speech (POS) token sequences of the grammatically accurate sentences;

receive a user data query for information from a user, the user data query comprising one or more variable names and corresponding values and at least a type of analysis for the variables;

access data responsive to the user data query from one or more data sources, the data sources comprising local data sources and external data sources;

generate a non-textual portion of a narrative response to the user from one or more of the local data sources and the external data sources;

provide at least the variable names and the corresponding values to the sentence struct model that is trained to generate the CFG from variables corresponding to the one or more variable names;

compose, by the sentence struct model the CFG based at least on the variable names and the corresponding values, wherein the CFG comprises a plurality of templates to be used for generating a plurality of grammatically accurate paraphrases for a textual portion of the narrative response, the plurality of templates comprising respective sequences of POS tokens;

identify by a language model, words and placeholders to respectively replace each of the POS tokens in the plurality of templates;

substitute the placeholders with values of the variables from intents supplied by the user to form a plurality of grammatically accurate paraphrases for the plurality of templates;

select one or more of the plurality of grammatically accurate paraphrases for inclusion into the narrative response; and generate the narrative response to the user data query, the narrative response including at least the non-textual portion and the textual portion comprising the one or more grammatically accurate paraphrases.

18. The non-transitory computer-readable storage medium of claim 17, the instructions for selecting the one or more of the plurality of grammatically accurate paraphrases for inclusion into the narrative response further comprising machine-readable instructions that cause a processor to:

provide access to the plurality of grammatically accurate paraphrases to the user for manual selection; and receive the user selection of the one or more of the plurality of grammatically accurate paraphrases for the inclusion into the narrative response.

19. The non-transitory computer-readable storage medium of claim 17, the instructions for selecting the one or more of the plurality of grammatically accurate paraphrases for inclusion into the narrative response further comprising machine-readable instructions that cause a processor to:

automatically select the one or more of the plurality of grammatically accurate paraphrases for the inclusion into the narrative response, wherein at least one of the selected one or more grammatically accurate paraphrases conveys information in addition to data conveyed in the non-textual portion of the narrative response.

* * * * *

UNITED STATES PATENT AND TRADEMARK OFFICE
CERTIFICATE OF CORRECTION

| | | |
|---|---|---|
| PATENT NO. | : 11,200,265 B2 | |
| APPLICATION NO. | : 15/590879 | |
| DATED | : December 14, 2021 | |
| INVENTOR(S) | : Swati Tata et al. | |

It is certified that error appears in the above-identified patent and that said Letters Patent is hereby corrected as shown below:

In the Claims

In Column 15, Line 20, Claim 1, reads "one or more" should read "the one or more"

Signed and Sealed this
Twenty-eighth Day of June, 2022

*Katherine Kelly Vidal*

Katherine Kelly Vidal
*Director of the United States Patent and Trademark Office*